Figure 1:
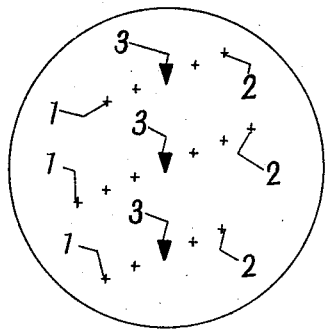

June 28, 1932. J. W. FRENCH 1,864,899
REFERENCE AND SUBSIDIARY MARKS IN STEREOSCOPIC OBSERVING INSTRUMENTS
Filed Dec. 23, 1929    2 Sheets-Sheet 1

INVENTOR
James Weir French
BY
Potter, Mechlin & O'Neill
ATTORNEYS

June 28, 1932.   J. W. FRENCH   1,864,899
REFERENCE AND SUBSIDIARY MARKS IN STEREOSCOPIC OBSERVING INSTRUMENTS
Filed Dec. 23, 1929   2 Sheets-Sheet 2

INVENTOR
James Weir French
BY
Ritter, Mechlin & O'Neill
ATTORNEYS

Patented June 28, 1932

1,864,899

UNITED STATES PATENT OFFICE

JAMES WEIR FRENCH, OF ANNIESLAND, GLASGOW, SCOTLAND, ASSIGNOR TO BARR AND STROUD, LIMITED, OF ANNIESLAND, GLASGOW, SCOTLAND

REFERENCE AND SUBSIDIARY MARKS IN STEREOSCOPIC OBSERVING INSTRUMENTS

Application filed December 23, 1929, Serial No. 416,030, and in Great Britain January 9, 1929.

This invention relates to optical observing or measuring instruments which operate on the stereoscopic principle, as for example stereoscopic range finders, with reference to which the invention will be described.

In a stereoscopic rangefinder it has been proposed to have, situated in each of the two fields viewed by the eyes of the observer, a group of marks the individual marks of which lie all in the focal plane, each mark of the one group corresponding with a particular mark of the other with which it can be fused or combined stereoscopically. The observer, instead of seeing two groups of marks lying in one focal plane then sees, stereoscopically, a single group of marks lying apparently in, say, a horizontal plane normal to the focal plane. The various stereoscopic marks appear to lie at various distances according to the actual relative separations of the corresponding marks of the two groups and may, in such a case, serve as a reference scale of distances. In each field of view there is also formed an image of the object, say a ship at sea, whose range is to be determined. These two images of the ship when combined stereoscopically by the eyes, appear as a single image of the ship lying at an apparent distance in the field of view which is determined by the separation of the two images in the two fields. The stereoscopic image of the ship can then be referred to the stereoscopic scale of marks in the field of view and thereby a measurement of the distance may be obtained.

In another arrangement of stereoscopic range finder it has been proposed to provide a pair of marks, one in each field instead of the two groups of marks, and optical or other means for altering the separation of the two images of the ship to be observed upon in the images of the ship to be observed upon in the fileds of view have been provided whereby the apparent stereoscopic distance of the image may be varied. The image of the ship may by such means be caused to appear to approach or recede. It may, therefore, be brought into the apparent plane of the stereoscopic mark which thus serves as an index mark of reference for the measurement of the displacement of the object image, say the image of the ship. The amount of apparent displacement of the object image then affords a measure of the object distance. Instead of altering the separation of the two images of the ship, the separation of the two index marks in the field of view is sometimes varied. Such variation causes the stereoscopic mark in the field of view to recede or approach, as the case may be. It may then be brought into the apparent plane of the image of the ship, the amount of motion affording, as before, an indication of the distance.

It will be convenient to assume that the stereoscopic range finder chosen for purposes of description is of the type in which a stereoscopic index mark in the field of view is fixed in position, and in which the stereoscopic image of the object can be made to advance or recede for the purpose of making the range measurement, but the invention is not restricted to that type. In such range finders it is customary to provide not only a single stereoscopic mark but also a series of subsidiary stereoscopic marks which appear stereoscopically to lie at intervals, in say, a horizontal plane. One mark of the series serves as an index of reference for the measurement of the distance of the object. The secondary marks serve to facilitate the stereoscopic combination of the actual marks or images in the fields of view. Such assistance is very necessary, as many people have difficulty in effecting the stereoscopic fusion or combination.

The present invention has for its object the provision in each field of view of two or more groups of marks of which each group in the one field corresponds with a particular group in the other field and the relative separation of corresponding marks differs within corresponding groups which, when combined stereoscopically, appear as single groups of marks lying in planes parallel or approximately parallel to one another, with the marks of each group at various distances in their plane. A further object of the invention is the facilitation of stereoscopic fusion or combination by perspective suggestion, say by the provision of subsidiary marks of such relative sizes or apparent relative spacing or both as to suggest perspective distance.

Some examples of stereoscopic fields according to this invention will now be described with reference to the accompanying drawings, in which:—

Figures 1, 2, 3, 4 and 5 show different arrangements of marks.

Figure 6:
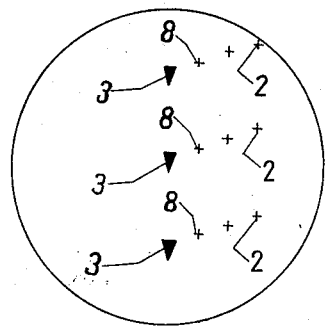
Figure 7:
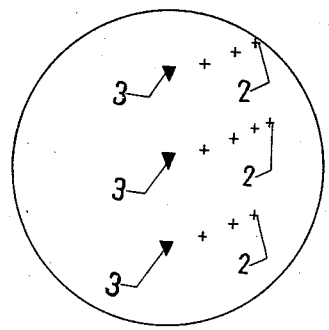

Figures 6 and 7 each show an arrangement having perspective suggestion, and

Figure 8:
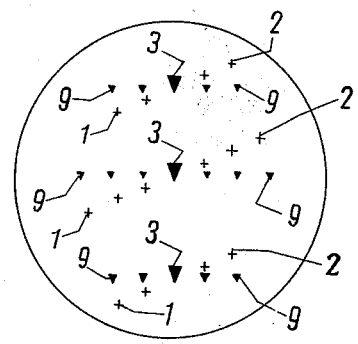

Figure 8 shows a further arrangement.

In all the examples the scale or reference mark is shown wedge-shaped and the subsidiary marks are shown as crosses. Any other suitable form of mark may, however, be used. For purposes of description three groups of marks in the field will be considered, one, say, near the centre and the others above and below. As it is not possible in one plane to represent the stereoscopic appearance of an object, distance of the respective marks is suggested by perspective drawing.

In Figure 1 the three stereoscopic groups of marks are drawn as if lying obliquely in the field of view. In actuality the marks of each group of these three groups might appear stereoscopically to lie approximately along the line of sight, the marks 1 being near, the marks 2 distant and the intermediate marks at intermediate distances. The measurement is made with reference to the marks 3 to which the object viewed stereoscopically is referred. The mark 3 is the reference mark and the others subsidiary marks.

Figure 2:
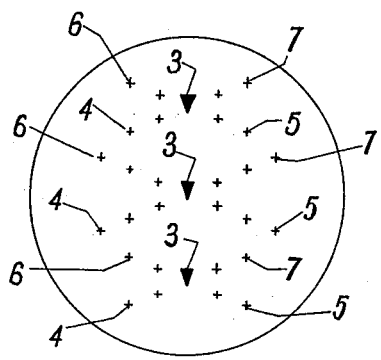
Figure 3:
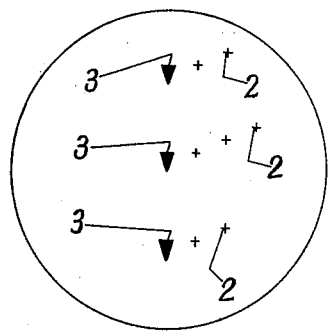
Figure 4:
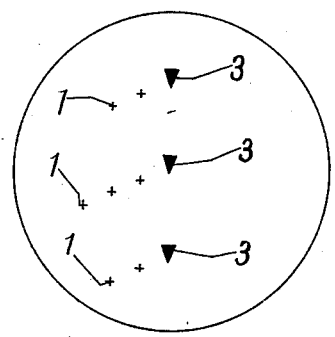
Figure 5:
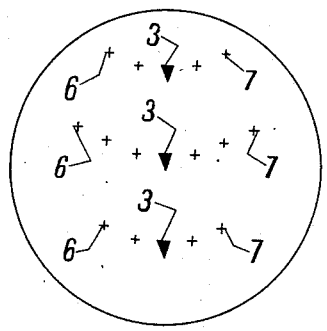

In Figure 2, the marks in each stereoscopic group appear as two diagonal lines of marks intersecting at the reference mark 3, the marks 4 and 5 being, say, near, and 6 and 7 distant. In both these arrangements the stereoscopic object in the field may be moved through the space in both the far and the near side of the mark 3. This scale mark may in other arrangements be so disposed as to correspond with the furthest position or the nearest position to which the stereoscopic object can apparently be set, or with positions slightly beyond these limits, as may be required for purposes of adjustment. If the mark 3 of Figure 1 were situated at the furthest distance, the subsidiary marks beyond 3 could be dispensed with and an appropriate arrangement may be as indicated in Figure 4. If the reference mark is situated at the nearest position, only the more distant subsidiary marks are required and the arrangement may be as indicated in Figure 3. If in Figure 2 the reference mark 3 is situated at the nearest distance, only the more distant subsidiary marks are required, as indicated in the example, Figure 5. The reference mark 3 could be situated at the furthest position, in which case only the nearer subsidiary marks would be required. When the reference mark is situated at nearly the furthest or nearly the nearest position, additional movement beyond these limits being provided for adjustment or other purposes, a subsidiary mark may be placed just on the far side of the reference mark when placed at the furthest distance, or just on the near side of the reference mark when placed at the nearest distance.

To facilitate stereoscopic fusion perspective suggestion is used. For example, this may be effected in two ways which may be used separately or, preferably, combined. For instance, the subsidiary marks of Figure 3, may be presented as in Figure 6, in which the subsidiary marks are made smaller in conformity with their apparent distance in the field of view. The mark 2 is the smallest, being apparently furthest away. The mark 8 nearest the scale or reference mark 3 is the largest of the subsidiary marks. The marks of, say, Figure 3 might also be as represented in Figure 7, in which the apparent spacing of the marks is varied perspectively, the distant marks being progressively closer to one another than the nearer marks. Generally the arrangements 6 and 7 will be combined; the size of subsidiary marks and their spacing being both varied.

With any of the groups of marks arranged in parallel planes other reference marks may be combined in the plane of the reference marks 3. For example, a series of auxiliary reference marks may be provided lying along a line in the field of view normal to the line containing the principal reference mark 3 as represented. For example, see Figure 8, which shows a horizontal row of auxiliary reference marks 9 added to the group of marks of Figure 1.

I claim:—

1. In stereoscopic observing instruments, the provision in each field of view of two or more groups of marks, of which each group in the one field corresponds with a particular group in the other field and the relative separation of corresponding marks differs within corresponding groups which, when combined stereoscopically, appear as single groups of marks lying in planes parallel or approximately parallel to one another, with the marks of each group at various apparent distances from the observer.

2. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups which when combined stereoscopically, appear as single groups of marks lying in planes parallel or approximately parallel to one another with the marks of each group at various apparent distances from the observer.

3. In stereoscopic observing instruments, the provision in each field of view of two or more groups of marks, of which each group in the one field corresponds with a particular group in the other field and the relative separation of corresponding marks differs within corresponding groups which, when combined stereoscopically appear as single groups of marks lying in planes parallel or approximately parallel to one another, with the marks of each group at various apparent distances from the observer, the character of the groups in the two fields suggesting perspective when combined.

4. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups, which, when combined stereoscopically appear as single groups of marks lying in planes parallel or approximately parallel to one another with the marks of each group at various apparent distances from the observer, the character of the groups in the two fields suggesting perspective when combined.

5. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups which when combined stereoscopically appear as single groups of marks lying in planes parallel or approximately parallel to one another, with the marks of each group at various distances from the observer, the subsidiary marks in the two fields of view being made progressively smaller the greater their apparent distance when viewed stereoscopically.

6. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups which when combined stereoscopically appear as single groups of marks lying in planes parallel or approximately parallel to one another with the marks of each group at various apparent distances from the observer, the subsidiary marks being spaced in the two fields of view at progressively decreasing intervals to cause their apparent spacing, when viewed stereoscopically, to decrease progressively as their apparent distance increases.

7. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups which when combined stereoscopically appear as single groups of marks lying in planes parallel or approximately parallel to one another with the marks of each group at various apparent distances from the observer, the subsidiary marks in the two fields of view being made progressively smaller and their spacing progressively decreasing as their apparent distance in the stereoscopic field increases.

8. In stereoscopic observing instruments, the provision in each field of view to two or more groups of marks each comprising a reference mark and a number of subsidiary marks, and of which each group in the one field corresponds with a particular group in the other field and the relative separation of corresponding marks differs within corresponding groups which, when combined stereoscopically appear as single groups of marks lying in planes parallel or approximately parallel to one another with the marks of each group at various apparent distances from the observer, and combined with, and in the plane of the reference marks of the groups additional reference marks.

9. In stereoscopic observing instruments, the provision in each field of view of two or more groups of marks each comprising a reference mark and a number of subsidiary marks, and of which each group in the one field corresponds with a particular group in the other field and the relative separation of corresponding marks differs within corresponding groups which when combined stereoscopically appear as single groups of marks lying in planes parallel or approximately parallel to one another with the marks of each group at various apparent distances from the observer, the subsidiary marks in the two fields of view being made progressively smaller and their spacing progressively decreasing as their apparent distance in the stereoscopic field increases, and combined with and in the plane of the reference marks of the groups, additional reference marks.

JAMES WEIR FRENCH.